UNITED STATES PATENT OFFICE.

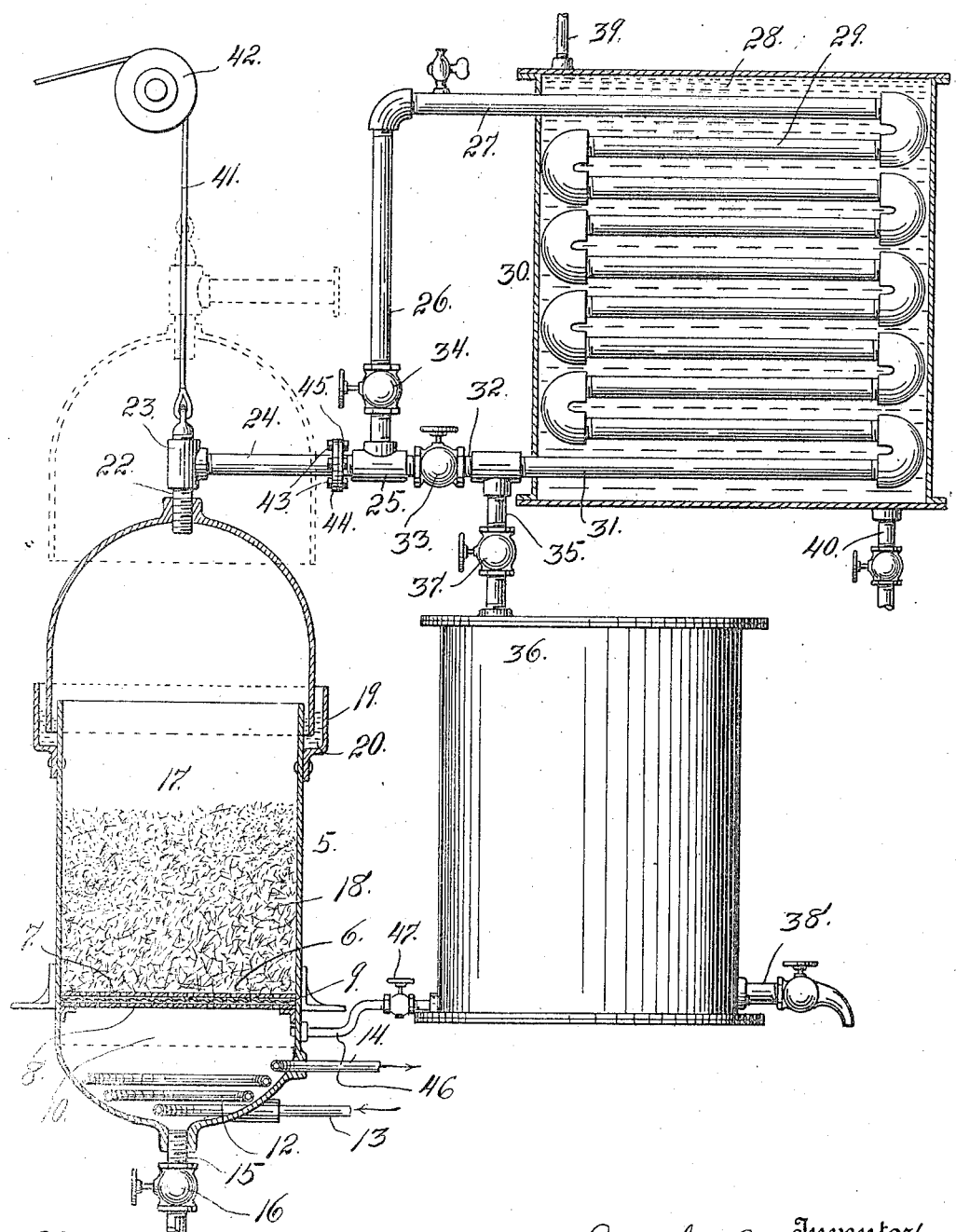

SAMUEL R. MURRAY AND GEORGE E. McDERMAND, OF DENVER, COLORADO, ASSIGNORS TO THE ROCKY MOUNTAIN ASPHALT MINING AND OIL REFINING COMPANY, OF DENVER, COLORADO, A CORPORATION OF COLORADO.

APPARATUS FOR EXTRACTING BITUMINOUS OIL, OIL COMPOUNDS, AND OTHER PRODUCTS FROM SAND ROCK AND OTHER MATERIAL.

1,060,010.   Specification of Letters Patent.   Patented Apr. 29, 1913.

Application filed September 26, 1911. Serial No. 651,453.

*To all whom it may concern:*

Be it known that we, SAMUEL R. MURRAY and GEORGE E. McDERMAND, citizens of the United States, residing in the city and county of Denver and State of Colorado, have invented certain new and useful Improvements in Apparatus for Extracting Bituminous Oil, Oil Compounds, and other Products from Sand Rock and other Material; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to apparatus for extracting bituminous oil, oil compounds and other products, from sand rock and other material and consists, broadly speaking, of a retort adapted to contain a charge to be treated, the said charge resting upon a filter bed located directly above a chamber adapted to receive a volatile substance, as gasolene, the said chamber being equipped with heating coils for purposes of volatilization.

The retort is provided with a liftable hood, normally liquid sealed, the lower edge of the hood dipping into an annular chamber surrounding the top of the body of the retort. In communication with the top of the hood of the retort is a condenser to which the vapor, formed by volatilizing the liquid in the bottom of the retort, is passed, the said condenser serving to return the gas to its liquid or normal condition, after which it is allowed to flow back into the retort and pass downwardly through the same charge, washing out the bituminous or oil compounds in the sand rock and carrying the same downwardly into the chamber in the bottom of the retort, where the volatile liquid and the extracted oil compound are mingled. A separation is then effected by revolatilizing the volatile substance and causing the vapor to pass again upwardly through the charge, after which it is recondensed in the cooler and drawn off in a reservoir. The bituminous or oil compounds, which have been separated from the charge of sand rock, may be drawn off at the bottom of the retort, after which the hood is lifted and the gangue or solid material removed, and a new charge substituted.

Having briefly outlined our improved construction, as well as the manner of handling the same, we will proceed to describe the construction in detail, reference being made to the accompanying drawing, which shows our improved apparatus partly in elevation and partly in section.

In this view, let the numeral 5 designate a retort, having a filter bed 6 in the bottom thereof, which may be composed of any suitable material. As illustrated in the drawing, it consists of upper and lower perforated plates 7 and 8, with an intervening layer 9 of mesh material. Below this filter bed is a relatively small compartment 10, in which is placed a coil 12 of pipe, having a steam inlet 13 and an outlet 14, whereby steam or other suitable heating medium may be circulated through the said chamber. The body of this chamber is equipped with an outlet pipe 15 controlled by a valve 16. Above the filter medium 6 of the retort is a relatively large chamber 17, adapted to receive a charge 18 of material to be treated. Surrounding the upper extremity of the retort is an annular chamber 19, which extends below the top of the retort, and is adapted to hold a quantity of liquid 20, whereby the top of the retort is sealed when the hood 21 is in the closed position, as illustrated in the drawing. This hood is of such size as to dip into the liquid seal 20 of the chamber 19 and occupy a position surrounding the upper extremity of the retort. The hood is of oval shape, and it is equipped at its top with an outlet pipe 22, which is connected by means of a T-coupling 23, with a pipe 24, provided with a T-coupling 25, from which a branch pipe 26 extends upwardly.

From the upper extremity of the pipe 26 a pipe member 27 extends horizontally into a chamber 28, containing a quantity of cooling liquid, the pipe 27 merging into a coil or series of pipe members 29 arranged in parallel relation and in connection with the chamber containing the cooling liquid, constituting a condenser, which in its entirety may be designated by the numeral 30. The bottom member 31 of the pipe, within the condenser chamber, communicates with the pipe 24 by means of a pipe member 32, in which is located a valve 33. The pipe 26 above the pipe 24 is also provided with a valve 34. Extending downwardly from the pipe member 32 between the pipe 31 and the valve 33 is a pipe 35 leading to a storage tank 36. In this pipe 35 is located a valve 37.

The storage tank is equipped with a draw-off faucet 38. The chamber of the condenser is provided at the top with an inlet pipe 39 and at the bottom with a valve-controlled outlet pipe 40. The hood 21 may be lifted from the retort by means of a cable 41, passing over a pulley 42, the cable leading to a drum (not shown), or any other suitable means, adapted to accomplish the purpose.

In order to lift the hood, the pipe 24, which is connected with the T-coupling 23, must be detached from the T-coupling 25 by removing the bolts 43, which connect meeting flanges 44 and 45, which are provided with registering perforations to receive the said bolts.

From the foregoing description, the use and operation of our improved apparatus will be readily understood. A charge of gasolene, or other suitable volatile liquid, is placed within the chamber 10 below the filter bed 6. A charge of material, as sand rock, carrying bituminous or oil compounds, is placed in the retort upon the filter bed. Steam or other suitable heating medium is passed through the coil 12 within the chamber 10. Assuming that the hood is in the closed position, whereby its lower edge dips into the liquid seal 20 surrounding the upper extremity of the retort, the apparatus is in condition for use.

The heating of the volatile liquid within the chamber 10 forms the said liquid into a vapor, which passes up through the filter bed, and thence through the charge 18 of sand rock, the said gas serving to free the bituminous and oil compounds within the charge. The vapor, after passing through the said charge, rises in the hood, and passes through the outlet 22, and thence through the pipe 24, the valve 33, which is open, the pipe member 32 and thence into the condenser, first entering the lowermost pipe 31 thereof, the vapor rising in the condenser until it is condensed, after which it automatically returns by the same route and passes back into the retort and down through the charge 18 and in its passage serves to wash out the freed bituminous and oil compounds which are carried by the volatile liquid downwardly through the filter bed into the chamber 10. The said chamber, in this event, contains the bituminous and oil compounds to be extracted in combination with the volatile liquid, which has served to produce the extraction. The said liquid is again volatilized by heating the same in the manner heretofore described, whereby it is all formed into a vapor and passed upwardly through the retort, thence into and through the pipe 24 and again upwardly through the valve 34, which is open, (the valve 33 being closed), and thence through the pipe 26 into the condenser, where it is returned to its liquid state and passes thence down through the pipe 35 and the valve 37, which is open, into the tank 36.

It must be understood that, during the first step of the process, viz., while the gas from the volatile liquid is caused to pass through the condenser, whereby it is condensed and returned to the retort in liquid form,—the valve 34 must be closed, while the valve 33 is open until the vapor is produced. At the same time, the valve 37 is closed. Now, during the second step of the operation, viz.,—during the separation of the volatile liquid from the extracted product within the chamber 10, the valve 33 is closed, and the valves 34 and 37 opened, allowing the gas to pass to the condenser where it is returned to liquid form, after which it flows into the storage tank, as heretofore explained.

The storage reservoir 36 may be connected with the chamber 10 of the retort by a pipe 46, leading from the bottom of the reservoir to the top of the chamber. This pipe is equipped with a valve 47. After the volatile liquid has been separated from the extracted product and the latter has been drawn off from the chamber 10, the valve 47, which is normally closed, is opened and the volatile liquid allowed to pass by gravity from the reservoir 36 to the chamber 10 for re-use. After the said chamber has been supplied with a sufficient quantity, the valve 47 is closed and kept closed until a second charge has been treated in the same manner and occasion arises for re-supplying the chamber 10 with the condensed volatile liquid.

Having thus described our invention, what we claim is:

In apparatus for extracting products from sand rock and other material, the combination of a retort having a diaphragm, separating the retort into two compartments, means for heating the lower compartment, a condenser, a connection between the retort and the condenser for passing the gas to the condenser and returning it to the retort in liquid form, said connection comprising a common pipe connected with the retort, an upwardly-extending branch pipe in connection with the upper extremity of the condenser, a return pipe from the condenser to the common pipe member, a valve located in the said return pipe, another valve located in the upwardly-extending branch pipe, a storage reservoir, and a valve-controlled pipe leading from the said return pipe to the storage reservoir, substantially as described.

In testimony whereof we affix our signatures in presence of two witnesses.

SAMUEL R. MURRAY.
GEORGE E. McDERMAND.

Witnesses:
CLORA E. BRADEN,
A. EBERT O'BRIEN.